United States Patent
Le Port et al.

[11] Patent Number: 6,136,413
[45] Date of Patent: Oct. 24, 2000

[54] LAMINATED SHEET WITH MULTIPLE EMBOSSED PATTERNS

[75] Inventors: Hervé Le Port, Rixheim; Pierre Laurent, Colmar; Rémy Perin, Sevres; Gilles Roussel, Colmar, all of France

[73] Assignee: Fort James France, Kunheim, France

[21] Appl. No.: 09/117,030

[22] PCT Filed: Jan. 20, 1997

[86] PCT No.: PCT/FR97/00104

§ 371 Date: Aug. 24, 1998

§ 102(e) Date: Aug. 24, 1998

[87] PCT Pub. No.: WO97/27365

PCT Pub. Date: Jul. 31, 1997

[30] Foreign Application Priority Data

Jan. 22, 1996 [FR] France ................................. 96 00667

[51] Int. Cl.[7] ....................................................... B32B 3/00
[52] U.S. Cl. ......................... 428/154; 428/172; 428/212
[58] Field of Search ................................... 428/152, 154, 428/156, 172, 153, 212

[56] References Cited

U.S. PATENT DOCUMENTS

| | | | |
|---|---|---|---|
| 4,307,141 | 12/1981 | Walbrun | 428/154 |
| 4,320,162 | 3/1982 | Schulz | 428/132 |
| 5,382,464 | 1/1995 | Ruppel et al. | 428/154 |

*Primary Examiner*—Donald Loney
*Attorney, Agent, or Firm*—Breiner & Breiner

[57] ABSTRACT

A sheet constituted by at least two plies of cellulose wadding or other layer of cellulose fibers having a specific surface weight between 10 and 40 $g/m^2$ and are embossed and assembled in such a manner that the protrusions defining the embossing patterns are pointing to the inside of the sheet and subtend cavities between them, the sheet being characterized in that the plies (10, 20) are embossed with different embossing patterns, a first pattern composed of first protrusions (12) having only a small surface at the tops and being at least $30/cm^2$ in one of the plies (10), and a second pattern composed of pattern elements (21) formed by second protrusions (22) having elongated tops, where the pattern elements are mutually spaced apart, and are present in the second ply (20).

9 Claims, 1 Drawing Sheet

LAMINATED SHEET WITH MULTIPLE EMBOSSED PATTERNS

The present invention relates to absorbent papers used for sanitary or household purposes and its objective is a sheet of at least two embossed plies, the sheet being used in the manufacture foremost of toilet paper but also of napkins, handkerchiefs or paper towels.

The sanitary or household paper industry resorts to an absorbent paper generally in creped form and of low specific surface weight, namely cellulose wadding or wadded woven, to manufacture these products. The stretchability imparted, for example by creping, is exploited to emboss the sheet, that is it is deformed permanently in spots and protrusions are created on one side corresponding to hollows on the other.

In the recent past, the trend has been toward softer, more velvety sanitary products by changing their thickness and strength, in particular by embossing. Embossing furthermore allows enhancement of the appearance of the product. Embossing is carried out either on a wet paper, that is in the wet portion of the papermaking machine, or on low-humidity papers, that is during processing. The present invention relates to dry paper processing.

The most commonplace embossing patterns consist of repeating elementary geometric protrusions of simple geometry and low cross-section. U.S. Pat. No. 3,414,459 provides an example relating to a laminated sheet consisting of a plurality of mutually bonded plies. The plies are embossed at a protrusion repetition rate and a protrusion height selected for making water-absorbent products, such as paper towels, the element density being between 5 and 30/cm$^2$. Applicant furthermore has developed, in particular for toilet paper, patterns in which the element density is higher, being from 30 to 80/cm$^2$. Necessarily the top surface of each of these elements is very small, being less than 1 mm$^2$. The latter embodiments offer an appearance like that of woven products. European Patent No. 426,548 describes such an embodiment. This kind of embossing affects foremost the features derived from sheet thickness. However, the attractiveness of its appearance is limited.

It has already been suggested, in order to improve visual attractiveness, to use patterns with much lower repetition rates than those above, preferably with fewer than 2000 elements/m$^2$ and with a much higher surface per unit of elements constituting the pattern, these elements being within a polygon of 2 to 6 cm$^2$. Such an embodiment is described in European Patent No. 265,298. In this patent, the protrusions forming these elements assume elongated cross-sections with linearly configured tops. Preferably, the curves so achieved are closed and impart a molleton effect to the pattern elements. Moreover, these elements are comparatively spaced far apart, subtending wide smooth zones of which the softness remains unaffected by embossing. This set of pattern features contributes in endowing the paper with the velvety and soft qualities perceived by the user. On the other hand, however, this pattern only moderately affects the physical properties. In particular, the thickness remains substantially the same. It is observed in this respect that the embossing efficacy is less. The cylinders must be engraved relatively deep to gain some thickness.

The objective of the invention is a laminated sheet of paper for sanitary or household purposes which offers higher thickness and soft and velvety properties imparted by the above patterns.

This objective is attained by means of a laminated sheet constituting at least two plies and made of cellulose wadding or another layer of cellulose fibers having a specific surface weight between 10 and 40 g/m$^2$. These plies are embossed and assembled so that the protrusions defining the embossed patterns are pointing to the inside of the sheet and subtend cavities between them. This sheet is characterized in that the plies are embossed with different patterns, a first pattern composed of low cross-section first protrusions having a density of at least 30/cm$^2$ being present on one of the plies and a second pattern composed of pattern elements composed of second protrusions with elongated tops being present on the second ply, where the pattern elements are spaced apart from each other.

It was found that this combination of a two ply sheet offers an increase in thickness of more than 10% relative to a sheet made according to European Patent No. 265,298 wherein the two plies were separately embossed in a pattern corresponding to the second pattern of the sheet of the invention and assembled and bonded at their respective tops.

In another feature of the invention, the first ply is embossed in a pattern in which the protrusion density is at least 40/cm In another feature of the invention, the pattern elements of the second pattern are individually located within a polygon of which the surface is between 2 and 6 cm$^2$.

In another feature of the invention, the number of elements is less than 2000/m$^2$.

Other features of the invention are elucidated below in relation to the description of an illustrative and non-limiting embodiment of the invention and to the attached drawings.

Figure 3:
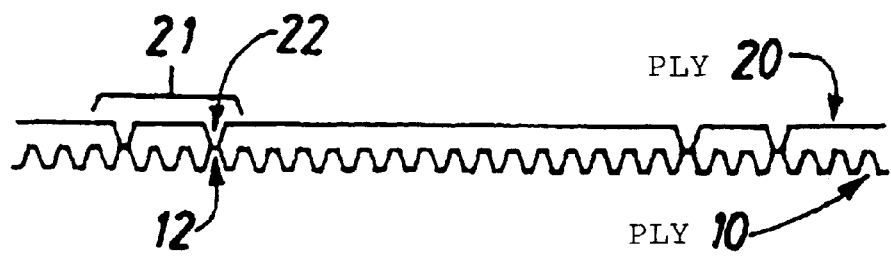

FIG. 3 schematically shows a cross-section of the sheet, and

Figure 4:
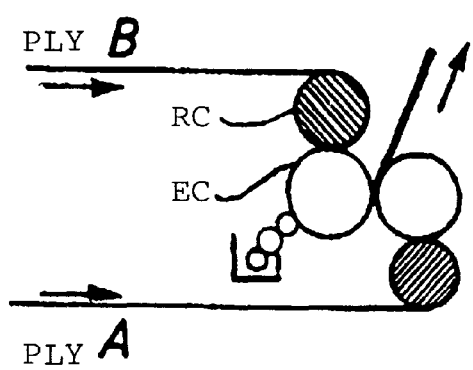

FIG. 4 schematically shows assembly and embossing apparatus.

In a preferred embodiment, the sheet of the invention is composed of two superposed, cellulose-wadding plies 10, 20. Cellulose wadding is creped paper of low specific surface weight between 10 and 40 g/m$^2$ which has been dried on a heated cylinder from which it was removed using a creping scraper.

The two plies are each embossed with a different pattern.

Figure 1:
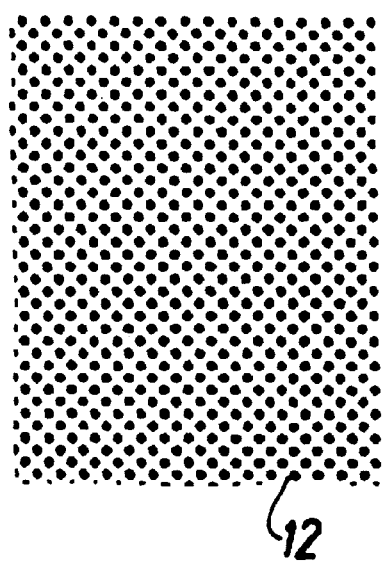
FIG. 1 is a view of one side of a sheet of the invention.

The first ply 10 is embossed with the pattern type shown in FIG. 1. This first pattern has first protrusions 12 uniformly distributed in the transverse and forward directions. This first pattern is characterized by a high number of protrusions per unit surface, namely at least 30/cm$^2$. However, optimal results are achieved both as regards appearance and thickness enhancement when the number of protrusions is between 40 and 80/cm$^2$. The surface of the top of each protrusion necessarily is low, namely in the order of 1 mm$^2$.

Figure 2:
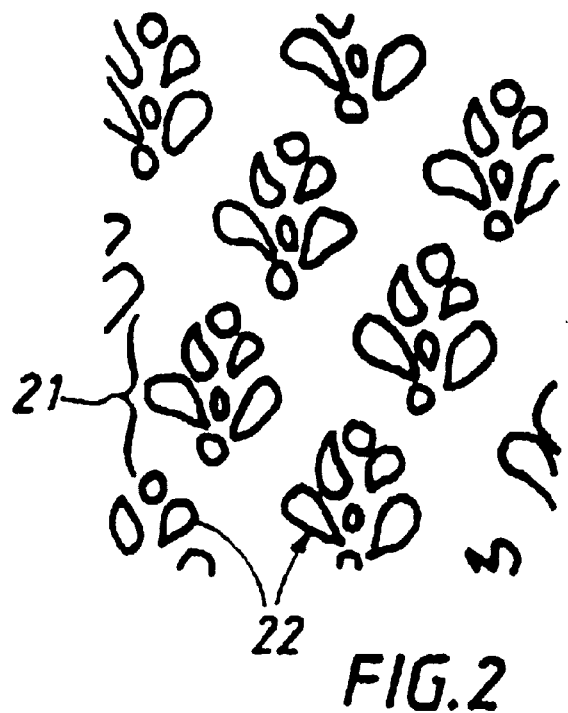
FIG. 2 is a view of the side opposite that of FIG. 1.

The second ply 20 is embossed with a pattern such as shown in FIG. 2. This pattern has elements 21, here shown as a flower, covering a substantially larger area than the first pattern elements. This area can be fitted inside a polygon having a surface between 2 and 6 cm$^2$. In the illustrated example, the elements 21 are regularly distributed over the plane of the sheet and in two directions such as that of advance and transverse. In comparison to the first pattern, the number of elements 21 is much lower, preferably being less than 2000/m$^2$, thereby leaving sufficient space between two elements so that, when touched, the surface will feel smooth.

The elements in turn have a plurality of protrusions 22 close to each other of which the imprint is linear. Accordingly, the design of the elements 21 is defined by segments of curves. In the example shown, the curves are closed, thereby enhancing the molleton effect provided by this kind of embossing.

FIG. 3 shows the sheet with the two superposed plies 10 and 20. These plies are configured in such a manner that the protrusions are inside the sheet. The two protrusions 12 and 22 may be bonded to each other in any way known to one skilled in the art, illustratively mechanically by knurling by passing the sheet between two knurlers.

Preferably, however, the two plies will be bonded to each other adhesively by depositing an adhesive between the protrusion tops in contact in the illustrated plies. In such a case, the adhesive is preferably deposited on the tops of the second pattern elements and advantageously it is colored to show details.

The manufacturing method for such a sheet is in the state of the art and known per se. A first cylinder is engraved with the first pattern with punches matching the desired protrusions 12. A second cylinder is engraved with the second pattern with punches matching the desired protrusions 22. The method involves separately embossing the two plies between the embossing cylinders and rubber cylinders and then in assembling the two plies in a tip-to-tip manner as known to one skilled in the art after the preferably water-based adhesive has been applied by a glue-depositing cylinder to the tops of one of the embossed plies.

Tests were run on a narrow, prototype machine having small diameter embossing cylinders in order to determine the extent to which this structure offers an increase in thickness relative to a sheet structure of two plies solely embossed with the second pattern.

In this prototype machine, schematically shown in FIG. 4, the diameters of the engraved cylinders (EC) and the rubber cylinders (RC) were 100 mm and the cladding of the rubber cylinders had a shore hardness of 45 shA.

The plies are made of sanitary-grade cellulose wadding having a specific surface weight of 18 g/m$^2$ and a thickness (of the two plies together) of 0.19 mm. The thickness was measured on a stack of 12 plies and interpolated to 2 plies.

A first ply A is embossed with the pattern of FIG. 1 at a protrusion density of 60/cm$^2$. It corresponds to one of the plies of the applicant's toilet paper which is marketed as LOTUS.

A second ply B is embossed with the pattern of FIG. 2 with 1700 flower elements per m$^2$, each flower being within a rectangle of 4.5 cm$^2$ and the width of the line marked by the protrusions being 0.7 mm. This ply corresponds to one of the toilet paper marketed by applicant as LOTUS PETITE FLEUR.

Two series of sheets were made, one by applying a particular embossing pressure P1, the other at a pressure P2, with P1<P2. The pressures depend on the pattern and were, respectively P1 6 kg/cm$^2$ rubber/pattern A, 4 kg/cm$^2$ rubber/pattern B, P2 8 kg/cm$^2$ rubber/pattern A, 5 kg/cm rubber/pattern B.

Following deposition of a water-based adhesive on ply B, the plies were combined in the following manner:

I 1 ply A with 1 ply B,

II 2 plies B,

III 1 unembossed ply with a ply B.

The thickness of the sample so made was measured from the thickness of 12 superposed plies and divided by 6.

| Sample | Thickness (mm) | |
| --- | --- | --- |
|  | P1 | P2 |
| I | 0.29 | 0.43 |
| II | 0.26 | 0.38 |
| III | 0.24 | 0.33 |

Thus, the thickness of sample I is larger than that of sample II, the increase being at least 12%.

What is claimed is:

1. A laminated sheet comprising at least two cellulosic plies with each ply having a specific surface weight between 10 and 40 g/m$^2$ and being embossed and assembled so that protrusions defining an embossing pattern point to the inside of the sheet and cavities are present between such protrusions, wherein two of said at least two cellulosic plies are each embossed with a different embossing pattern, one ply with a first pattern comprising first protrusions with top surfaces and of a number of at least 30/cm$^2$, and a second ply with a second pattern comprising pattern elements formed by second protrusions of elongated shape and of a number less than the number of said first protrusions, said pattern elements being spaced apart from each other.

2. Sheet as claimed in claim 1 wherein the first pattern has at least 40 first protrusions per cm$^2$.

3. Sheet as claimed in claim 1 wherein the top surfaces of the first protrusions are each less than 1 mm$^2$.

4. Sheet as claimed in claim 2 wherein the top surfaces of the first protrusions are each less than 1 mm$^2$.

5. Sheet as claimed in claim 1, 2, 3 or 4 wherein the pattern elements of the second pattern each encompass an area of 2 to 6 cm$^2$.

6. Sheet as claimed in claim 1 wherein the pattern elements of the second pattern are present in an amount of less than 2000/m$^2$.

7. Sheet as claimed in claim 1 wherein at least one of the second protrusions has a top with a closed line shape.

8. Sheet as claimed in claim 1 wherein at least one of the second protrusions has a top in an open line form.

9. Sheet as claimed in claim 1 wherein said at least two cellulosic plies are bonded to each other by an adhesive interposed between tops of the first protrusions and tops of the second protrusions.

* * * * *

UNITED STATES PATENT AND TRADEMARK OFFICE
CERTIFICATE OF CORRECTION

PATENT NO.    : 6,136,413
DATED         : October 24, 2000
INVENTOR(S)   : Hervé Le Port et al.

Page 1 of 1

It is certified that error appears in the above-identified patent and that said Letters Patent is hereby corrected as shown below:

<u>Column 4, claim 6,</u>
Line 43, "claim 1" should read -- claim 5 --.

Signed and Sealed this

Fifteenth Day of January, 2002

Attest:

JAMES E. ROGAN
*Attesting Officer*     *Director of the United States Patent and Trademark Office*